United States Patent
Higuchi et al.

(10) Patent No.: US 8,155,941 B2
(45) Date of Patent: Apr. 10, 2012

(54) SIMULATION APPARATUS, SIMULATION SYSTEM, AND SIMULATION METHOD

(75) Inventors: Takashi Higuchi, Kobe (JP); Hirotoshi Tonou, Kobe (JP); Takeshi Yamasaki, Kobe (JP); Yu Moriyama, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 525 days.

(21) Appl. No.: 12/311,219

(22) PCT Filed: Sep. 28, 2007

(86) PCT No.: PCT/JP2007/068984
§ 371 (c)(1),
(2), (4) Date: Mar. 23, 2009

(87) PCT Pub. No.: WO2008/038770
PCT Pub. Date: Apr. 3, 2008

(65) Prior Publication Data
US 2009/0240477 A1    Sep. 24, 2009

(30) Foreign Application Priority Data
Sep. 29, 2006  (JP) ................. 2006-268815

(51) Int. Cl.
*G06F 9/455* (2006.01)
(52) U.S. Cl. .............................. 703/7
(58) Field of Classification Search ........... 703/7, 13; 700/213, 79; 702/123, 124; 303/146; 370/335; 714/6.12; 701/3, 51, 36
See application file for complete search history.

(56) References Cited

U.S. PATENT DOCUMENTS

| | | | |
|---|---|---|---|
| 4,728,545 A | | 3/1988 | Kurauchi et al. |
| 5,459,857 A | * | 10/1995 | Ludlam et al. ............. 714/6.12 |
| 6,647,301 B1 | * | 11/2003 | Sederlund et al. ............. 700/79 |
| 6,865,458 B1 | * | 3/2005 | Kim ............................... 701/36 |
| 2002/0022939 A1 | * | 2/2002 | Senta et al. .................... 702/123 |
| 2003/0135299 A1 | * | 7/2003 | Tachibana et al. ............ 700/213 |
| 2005/0234607 A1 | * | 10/2005 | Cartmell et al. ................. 701/3 |
| 2005/0275284 A1 | * | 12/2005 | Katayama ..................... 303/146 |
| 2006/0089774 A1 | * | 4/2006 | Steen et al. ..................... 701/51 |
| 2007/0014263 A1 | * | 1/2007 | Ferrato et al. ................. 370/335 |
| 2008/0281549 A1 | * | 11/2008 | Ishio et al. .................... 702/124 |

FOREIGN PATENT DOCUMENTS

| | | |
|---|---|---|
| GB | 2 210 181 A | 6/1989 |
| JP | A-61-161553 | 7/1986 |
| JP | A-62-22101 | 1/1987 |
| JP | A-1-112302 | 5/1989 |
| JP | A-10-289121 | 10/1998 |
| JP | A-2000-194682 | 7/2000 |
| JP | A-2003-345478 | 12/2003 |
| JP | A-2004-361292 | 12/2004 |

* cited by examiner

*Primary Examiner* — Kandasamy Thangavelu
(74) *Attorney, Agent, or Firm* — Oliff & Berridge, PLC (57) ABSTRACT

A simulation apparatus includes an arithmetic process unit 20 that models a controlled plant and simulates the operation of the modeled controlled plant, and an interface unit 30 that inputs and outputs a signal between the arithmetic process unit 20 and an ECU 100A, and the arithmetic process unit 20 is configured so as to be capable of inputting and outputting the signal from/to the ECU 100A by using another interface unit 30 provided on another simulation apparatus in addition to the interface unit 30.

12 Claims, 7 Drawing Sheets

SIMULATION APPARATUS, SIMULATION SYSTEM, AND SIMULATION METHOD

TECHNICAL FIELD

The present invention relates to a simulation apparatus used to the development of an electronic control unit for a vehicle, for example, as well as a simulation and a simulation system.

BACKGROUND ART

In a vehicle, a lot of electronic control units (ECUs) controlling various controlled plants (controlled objects) such as an engine, a power steering, a brake, and a torque converter are installed.

In the development phase and the design phase of the ECUs as mentioned above, a simulator which is called so-called HILS (Hardware In the Loop Simulation) and simulates responses equal with a real engine is used on behalf of each controlled plant such as the real engine (see Reference 1, for example).

The HILS includes an interface unit for inputting and outputting a signal from/to the ECU.

[Reference 1] Japanese Unexamined Patent Publication No. 2004-361292

DISCLOSURE OF THE INVENTION

Problems to be Solved by the Invention

In the interface unit of the HILS, the specifications of the terminals in the interface unit are decided depending on the controlled plants. Therefore, when the controlled plant is changed, there may be an insufficient signal terminal in the interface unit. When there is an insufficient signal terminal, it is necessary to produce a new HILS. On the contrary, in another HILS, there may be a remaining terminal in the interface unit.

The present invention has been made in view of the above circumstances and provides a simulation apparatus that can effectively utilize signal terminals which are provided on simulation apparatuses, and input and output signals from/to a controller.

Means for Solving the Problems

According to a first aspect of the present invention, there is provided a simulation apparatus that simulates a controlled object which a controller controls, comprising: an arithmetic process portion that executes an arithmetic operation to simulate the controlled object; and a signal terminal that executes at least one of inputting and outputting a signal between the arithmetic process portion and the controller; wherein the arithmetic process portion executes at least one of inputting and outputting the signal from/to the controller by using another signal terminal provided on another simulation apparatus, the arithmetic process portion being connected to the another simulation apparatus by communication.

With the above composition, even if there is no unused signal terminal in the simulation apparatus, it is possible to utilize another signal terminal provided on another simulation apparatus.

According to a second aspect of the present invention, there is provided a simulation apparatus that simulates a controller controlling a controlled object, including: an arithmetic process portion that executes an arithmetic operation to simulate the controller; and a signal terminal that executes at least one of inputting and outputting a signal between the arithmetic process portion and the controlled object; wherein the arithmetic process portion executes at least one of inputting and outputting the signal from/to the controlled object by using another signal terminal provided on another simulation apparatus, the arithmetic process portion being connected to the another simulation apparatus by communication.

In the above composition, the arithmetic process portion may include a model arithmetic portion that executes a model arithmetic operation to simulate the controlled object, and the simulation apparatus may comprise a data communication process portion that executes data communication between the model arithmetic portion and the signal terminal.

In the above composition, the data communication process portion may be composed of an arithmetic device which is different from the model arithmetic portion, and execute a process.

In the above composition, the arithmetic process portion may execute at least one of inputting and outputting the signal from/to the controlled object by using a signal terminal provided on another simulation apparatus, without using another arithmetic process portion provided on another simulation apparatus, the arithmetic process portion being connected to the another simulation apparatus by communication.

In the above composition, the arithmetic process portion may be connected to the signal terminal by a bus, and the bus may be connected to another arithmetic process portion and another signal terminal in the another simulation apparatus.

In the above composition, the arithmetic process portion may retain management information on the another signal terminal provided on the another simulation apparatus, and assign the signal to the another signal terminal based on the management information.

According to a third aspect of the present invention, there is provided a simulation system that connects a first simulation apparatus simulating a first controlled object which a first controller controls, and a second simulation apparatus simulating a second controlled object which a second controller controls, to each other, and executes simulation, comprising: the first simulation apparatus including: a first arithmetic process portion that executes an arithmetic operation to simulate the first controlled object; and a first signal terminal that executes at least one of inputting and outputting a signal between the first arithmetic process portion and the controller; and the second simulation apparatus including: a second arithmetic process portion that executes an arithmetic operation to simulate the second controlled object; and a second signal terminal that executes at least one of inputting and outputting a signal between the second arithmetic process portion and the controller; wherein the first arithmetic process portion executes at least one of inputting and outputting the signal from/to the first controller by using the second signal terminal.

According to a fourth aspect of the present invention, there is provided a simulation system that connects a first simulation apparatus simulating a first controller controlling a first controlled object, and a second simulation apparatus simulating a second controller controlling a second controlled object, to each other, and executes simulation, comprising: the first simulation apparatus including: a first arithmetic process portion that executes an arithmetic operation to simulate the first controller; and a first signal terminal that executes at least one of inputting and outputting a signal between the first arithmetic process portion and the controlled object; and the second simulation apparatus including: a second arithmetic process portion that executes an arithmetic operation to simulate the second controller; and a second signal terminal that executes at least one of inputting and outputting a signal between the second arithmetic process portion and the controlled object; wherein the first arithmetic process portion executes at least one of inputting and outputting the signal from/to the first controlled object by using the second signal terminal.

According to a fifth aspect of the present invention, there is provided a simulation system simulating a controlled object which a controller controls, comprising: a simulation apparatus including an arithmetic process portion that executes an arithmetic operation to simulate the controlled object, and a signal terminal that executes at least one of inputting and outputting a signal between the arithmetic process portion and the controller; and a signal terminal apparatus including a signal terminal that executes at least one of inputting and outputting a signal between the arithmetic process portion and the controller; wherein the arithmetic process portion in the simulation apparatus executes at least one of inputting and outputting the signal from/to the controller by using the signal terminal provided on the signal terminal apparatus, the arithmetic process portion being connected to the signal terminal apparatus by communication.

According to a sixth aspect of the present invention, there is provided a simulation system simulating a controller controlling a controlled object, comprising: a simulation apparatus including an arithmetic process portion that executes an arithmetic operation to simulate the controller, and a signal terminal that executes at least one of inputting and outputting a signal between the arithmetic process portion and the controlled object; and a signal terminal apparatus including a signal terminal that executes at least one of inputting and outputting a signal between the arithmetic process portion and the controlled object; wherein the arithmetic process portion executes at least one of inputting and outputting the signal from/to the controlled object by using the signal terminal provided on the signal terminal apparatus, the arithmetic process portion being connected to the signal terminal apparatus by communication.

According to a seventh aspect of the present invention, there is provided a simulation method simulating a controlled object which a controller controls, comprising: executing at least one of inputting and outputting a signal from/to the controller by using a signal terminal provided on another simulation apparatus; and executing an arithmetic operation to simulate the controlled object.

According to an eighth aspect of the present invention, there is provided a simulation method simulating a controller controlling a controlled object, comprising: executing at least one of inputting and outputting a signal from/to the controlled object by using a signal terminal provided on another simulation apparatus; and executing an arithmetic operation to simulate the controller.

Effects of the Invention

According to the present invention, it is capable of effectively utilizing signal terminals which are provided on simulation apparatuses, and input and output signals from/to a controller.

BEST MODES FOR CARRYING OUT THE INVENTION

A description will now be given of preferred embodiments of the present invention with reference to the accompanying drawings.

Figure 1:
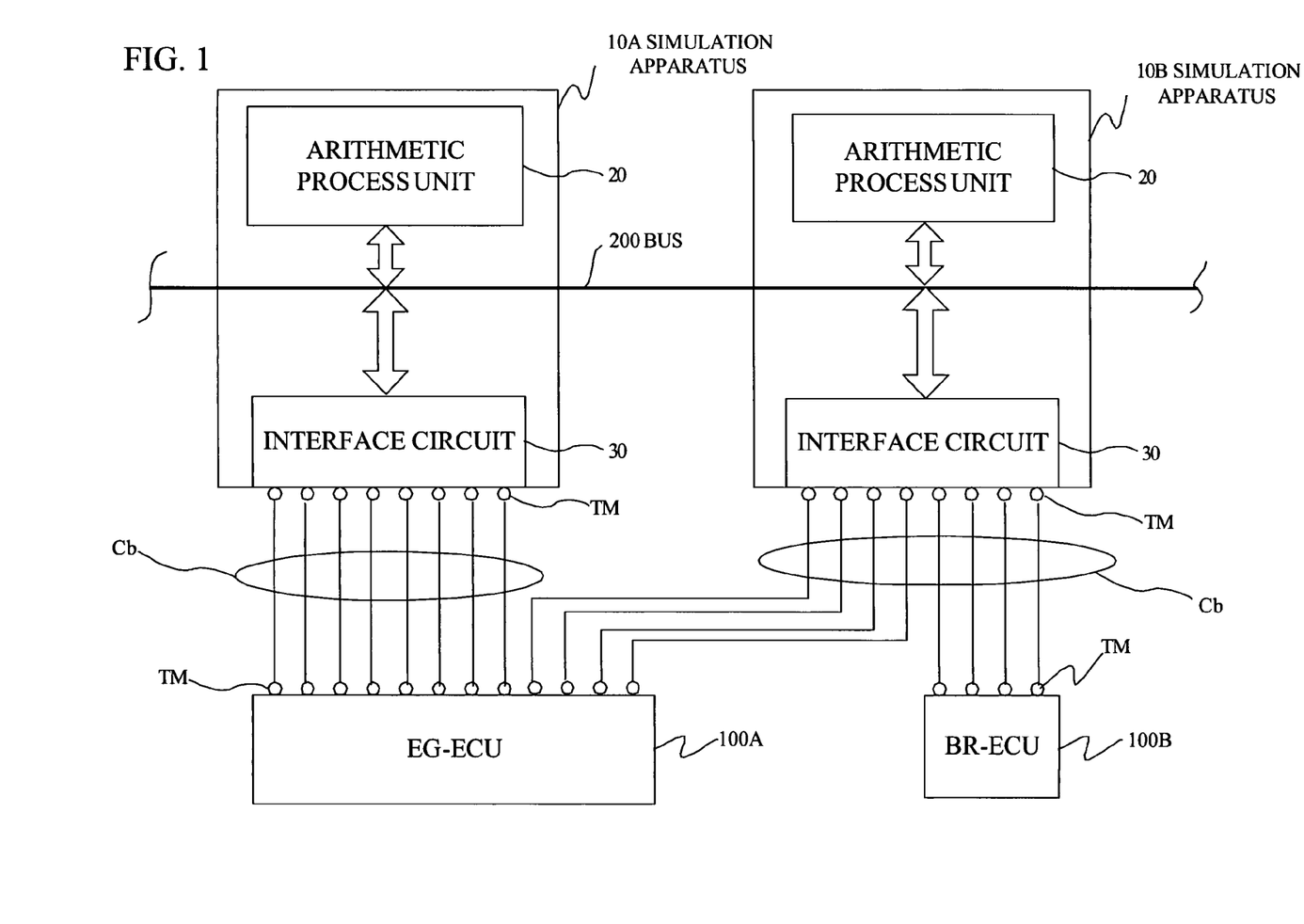
FIG. 1 is a block diagram showing the construction of a simulation system to which a simulation is applied, according to an embodiment of the present invention.
Figure 2:
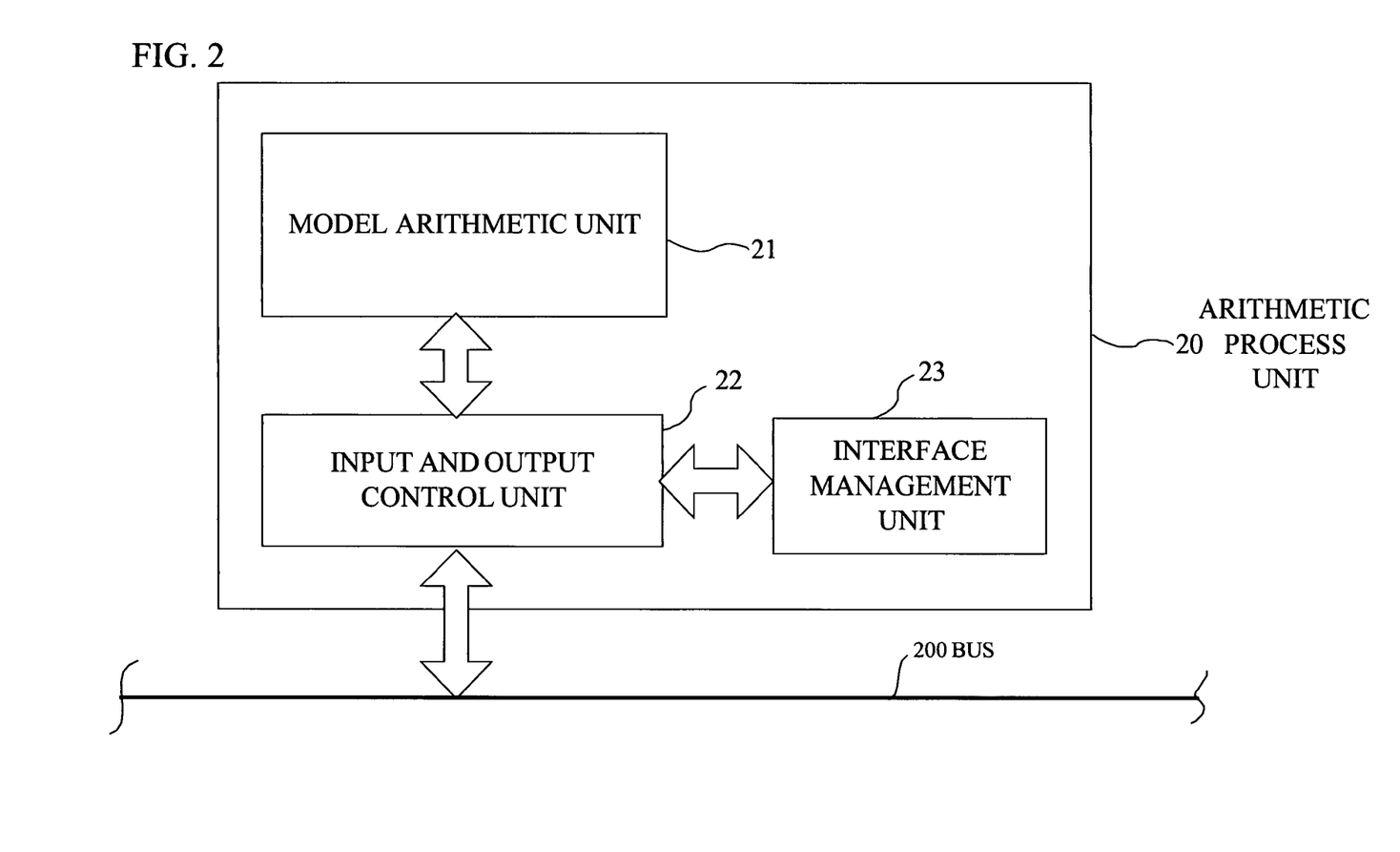
FIG. 2 is a functional diagram showing the construction of an arithmetic process unit.

FIGS. 1 and 2 show an embodiment of the present invention. FIG. 1 is a block diagram showing the construction of a simulation system to which the present invention is applied, and FIG. 2 is a functional diagram of an arithmetic process unit.

The simulation system is composed of a plurality of simulation apparatuses 10A and 10B connected with each other via the bus 200, as shown in FIG. 1.

The basic constructions of the simulation apparatuses 10A and 10B are the same as each other, as shown in FIG. 1. Each of the simulation apparatuses 10A and 10B includes an arithmetic process unit 20 and an interface circuit 30.

The simulation apparatus 10A is used for simulating the operation of an engine system based on input and output signals. Basically, an engine ECU 100A as a controller is connected to the simulation apparatus 10A.

The simulation apparatus 10B is used for simulating a control plant of a brake system. Basically, an brake ECU 100B as a controller is connected to the simulation apparatus 10B.

The engine ECU 100A is composed of hardware such as a processor and a memory, not shown, required software, and so on. The engine ECU 100A transfers and receives various signals for engine control to/from the simulation apparatus 10A. A plurality of input and output terminals TMs as signal terminals of the engine ECU 100A are connected to all input and output terminals TMs provided on the interface circuit 30 of the simulation apparatus 10A, and a part of input and output terminals TMs provided on the interface circuit 30 of the simulation apparatus 10B, with cables Cbs. That is, the engine ECU 100A includes the input and output terminals TMs more than the input and output terminals TMs of the interface circuit 30 of the simulation apparatus 10A.

The brake ECU 100B is composed of hardware such as a processor and a memory, not shown, required software, and so on. The brake ECU 100B transfers and receives various signals for engine control to/from the simulation apparatus 10B. A plurality of input and output terminals TMs are connected to a part of input and output terminals TMs provided on the interface circuit 30 of the simulation apparatus 10B, with cables Cbs. That is, the brake ECU 100B includes the input and output terminals TMs less than the input and output terminals TMs of the interface circuit 30 of the simulation apparatus 10B. Free channels exist in the interface circuit 30 of the simulation apparatus 10B, and some of the input and output terminals TMs of the engine ECU 100A are connected to the unused channels.

The interface circuit 30 performs processes of a level conversion of the input and output signals, a conversion from an analog signal to a digital signal, a conversion from the digital signal to the analog signal, and transfers and receives signals of predetermined channels. Each interface circuit 30 is connected to the bus 200, and inputs and outputs signals via the bus 200.

The arithmetic process unit 20 is composed of a model arithmetic unit 21, an input and output control unit 22, an interface management unit 23, and so on, as shown in FIG. 2, and the functions thereof are achieved by hardware such as the processor and the memory, not shown, required software, and so on.

The model arithmetic unit 21 performs an arithmetic operation of a control plant model of the engine system and the brake system based on a signal input from the input and output control unit 22, and outputs the performance results to the input and output control unit 22. In the case of the engine for example, the model arithmetic unit 21 inputs a opening degree of a throttle gate from the input and output control unit 22, calculates various state amounts such as a temperature of an engine oil, a temperature of an exhaust gas, and an oxygen density of the exhaust gas, and outputs the state amounts to the input and output control unit 22.

As shown in FIG. 2, the input and output control unit 22 writes signals from output ports of the model arithmetic unit 21 into corresponding channels of the interface management unit 23, based on management information from the interface management unit 23, described hereinbelow, and writes a signal from each channel of the interface circuit 30 into an input port of the model arithmetic unit 21.

The interface management unit 23 retains the management information of all the interface circuits 30, i.e., the management information of the interface circuits 30 in the simulation apparatuses 10A and 10B. Thereby, each of the simulation apparatuses 10A and 10B can know the management information (e.g. information on an unused state of each channel, usage information, failure information, and so on) of another interface circuit 30 other than one's own interface circuit 30. Therefore, the interface management units 23 of the simulation apparatuses 10A and 10B retain the same information.

Next, a description will now be given of the flow of signals in the simulation system with the above-mentioned construction, with reference to FIG. 3.

Figure 3:
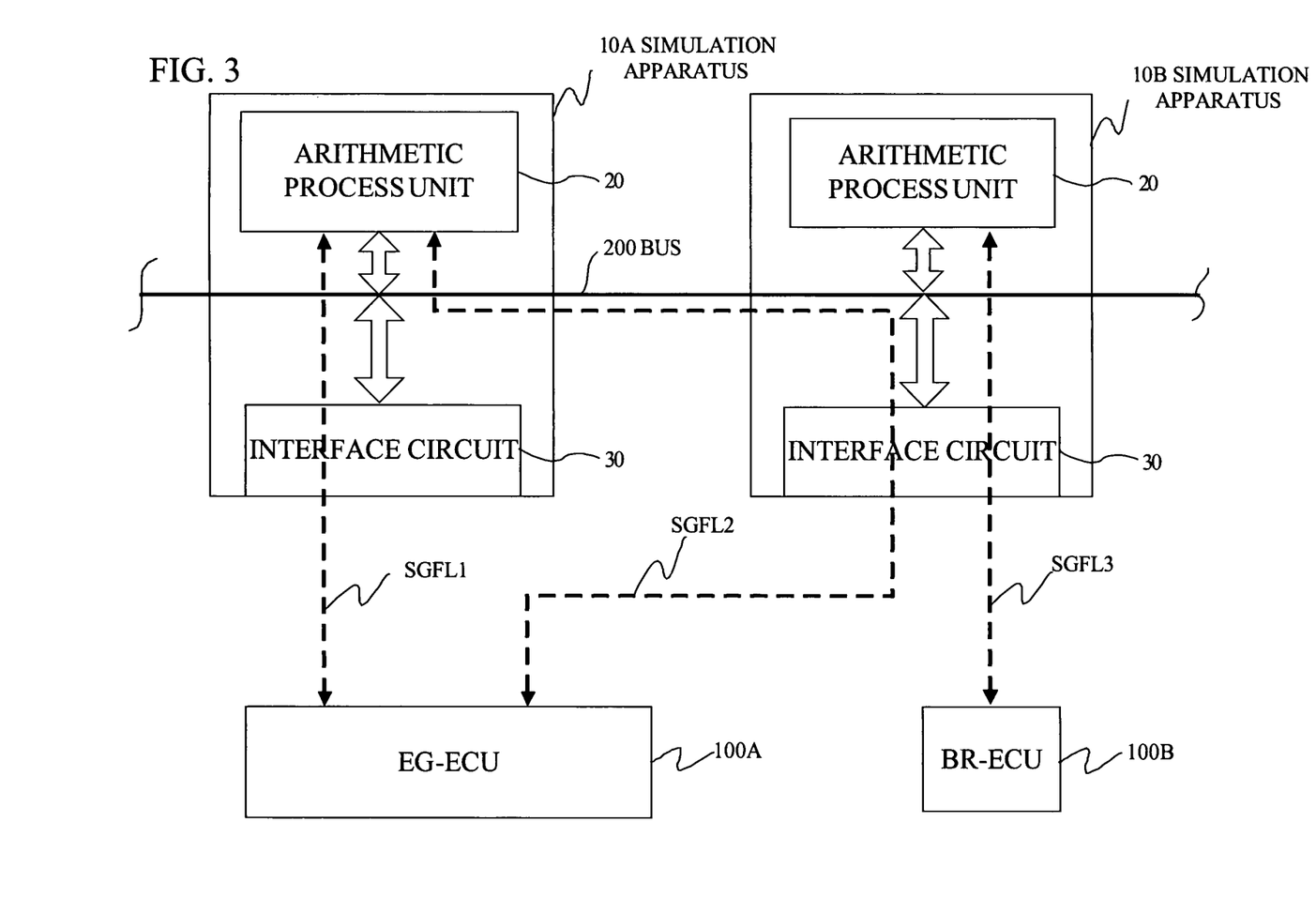
FIG. 3 is a diagram useful in explaining the flow of signals.

As shown in FIG. 3, a flow of signals SGFL1 passing the bus 200 and the interface circuit 30 of the simulation apparatus 10A, and a flow of signals SGFL2 passing the bus 200 and the interface circuit 30 of the simulation apparatus 10B exist between the engine ECU 100A and the arithmetic process unit 20 of the simulation apparatus 10A. That is, the arithmetic process unit 20 of the simulation apparatus 10A inputs and outputs the signals by using a part of the interface circuit 30 provided on the simulation apparatus 10B in addition to one's own interface circuit 30. The flow of the signals SGFL2 passing the bus 200 and the interface circuit 30 of the simulation apparatus 10B does not pass the arithmetic process unit 20 of the simulation apparatus 10B, and hence the signals can be directly transferred and received to/from the arithmetic process unit 20 of the simulation apparatus 10A whereby a high-speed signal process is achieved.

On the other hand, a flow of signals SGFL3 passing the bus 200 and the interface circuit 30 of the simulation apparatus 10B exist between the brake ECU 100B and the arithmetic process unit 20 of the simulation apparatus 10B. The flow of the signals SGFL3 exists independently of the above-mentioned flows of the signals SGFL1 and SGFL2, and hence interference between the SGFL3, and the SGFL1 and the SGFL2 does not occur.

Thus, in the present embodiment, when the signals are input and output between the plurality of simulation apparatuses 10A and 10B, and the engine ECU 100A and the brake ECU 100B, the number of channels which is insufficient on the simulation device 10A side can be supplemented by using unused areas on the simulation device 10B side.

Figure 4:
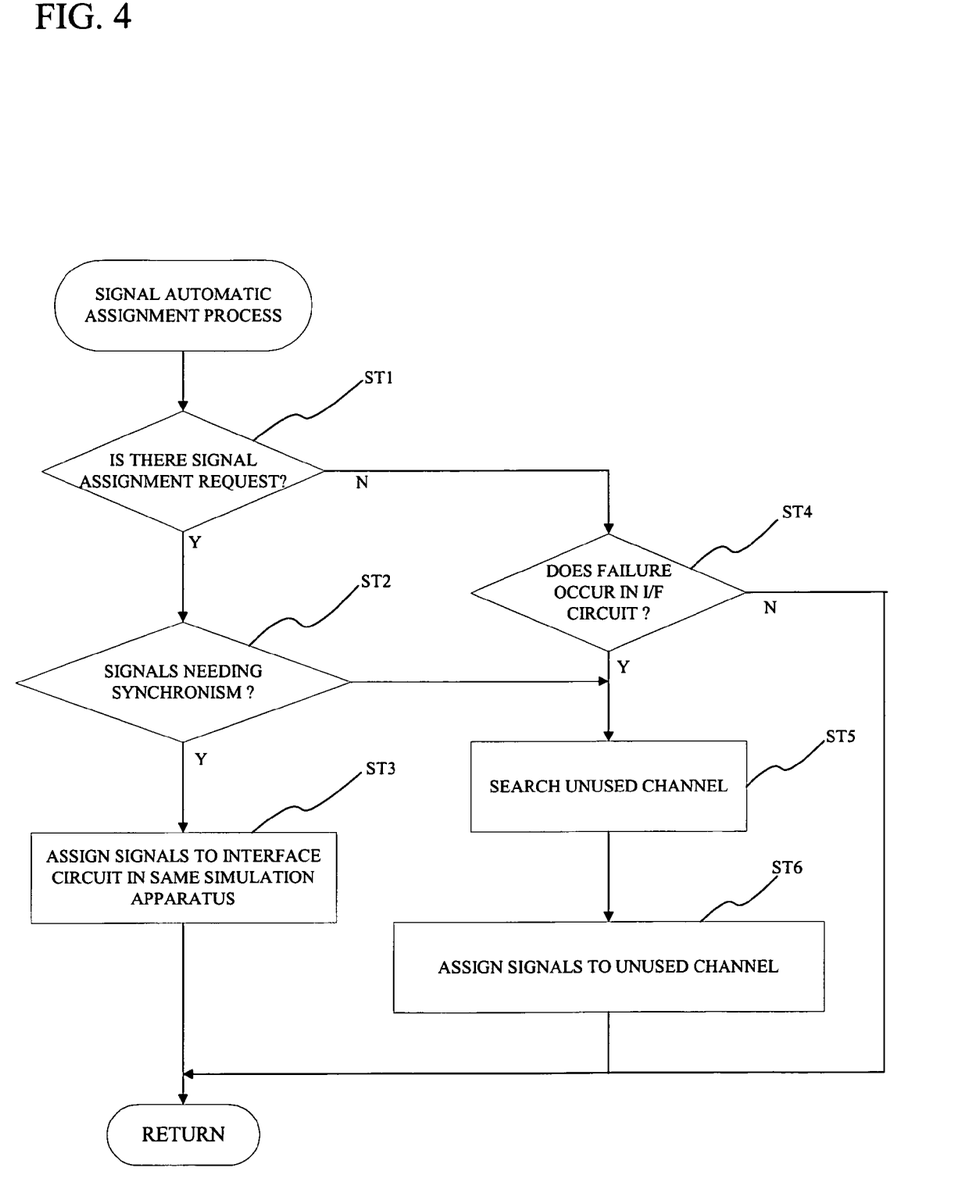
FIG. 4 is a flowchart showing an example of a signal automatic assignment process performed by the arithmetic process unit.

Next, a description will now be given of an automatic assignment process that assigns the input and output signals to the interface circuit 30 and is performed by each of the plurality of simulation apparatuses 10A and 10B, with reference to a flowchart in FIG. 4.

For example, each arithmetic process unit 20 in each of the simulation apparatuses 10A and 10B determines whether there is a signal assignment request from a host computer or the like, not shown, connected to each of the simulation apparatuses 10A and 10B (step ST1). That is, when the number of necessary input and output signals is changed by changing the simulated model, it is necessary to assign newly generated signals to any of channels in the interface 30.

When it is determined in step ST1 that there is the signal assignment request, the arithmetic process unit 20 determines whether the signals are signals needing synchronism (step ST2). Here, the signals needing synchronism mean a plurality of signals that are synchronized with each other, and should be input and output substantially at the same time. If such signals needing synchronism are separately assigned to the interface circuit 30 of the simulation apparatus 10A and the interface circuit 30 of the simulation apparatus 10B, it is difficult to keep the synchronism. Therefore, in this case, the arithmetic process unit 20 assigns the signals needing synchronism to any one of the interface circuits 30 of the simulation apparatuses 10A and 10B (i.e., assigns the signals needing synchronism to the interface circuit in the same simulation apparatus) (step ST3).

When it is determined in step ST2 that the signals are not signals needing synchronism, the arithmetic process unit 20 searches an unused channel in all the interface circuits 30 by referring to the management information in the interface management units 23 (step ST5), and assigns the signals to the searched unused channel (step ST6).

When it is determined in step ST1 that there is not the signal assignment request, the arithmetic process unit 20 determines whether a failure occurs in the interface circuit 30 (step ST4). When it is determined that the failure occurs in the interface circuit 30, the arithmetic process unit 20 searches an unused channel in all the interface circuits 30 by referring to the management information in the interface management units 23 (step ST5), and assigns the signals to the searched unused channel (step ST6). Thereby, it is possible to automatically restore the assignment of the input and output signals when the failure of the interface circuit 30 occurs.

Figure 5:
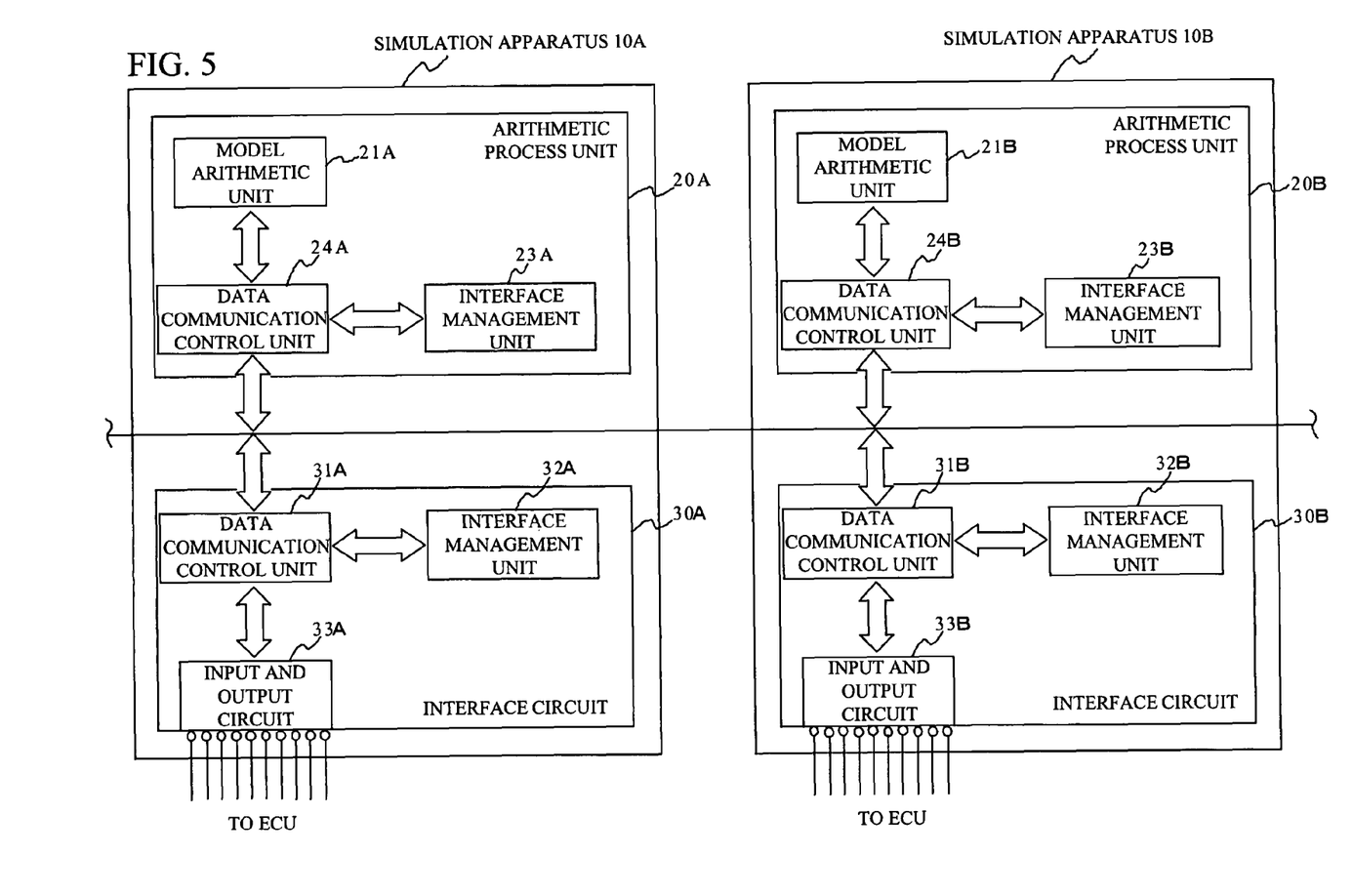
FIG. 5 is a diagram showing in detail the constructions of the arithmetic process unit and an interface circuit.

In the arithmetic process units 20 and the interface circuits 30 of the simulation apparatuses 10 as shown in FIG. 5, data communication control units 24 and 31 are provided. The data communication control units 24 and 31 control communication between the model arithmetic units 21 and the interface circuits 30 in the simulation apparatuses 10. For example, the data communication control units 24A and 31A control the communication between the model arithmetic unit 21A and the interface circuit 30A in the simulation apparatus 10A, and the data communication control units 24B and 31B control the communication between the model arithmetic unit 21B and the interface circuit 30B in the simulation apparatus 10B. It should be noted that, in order to distinguish between the two simulation apparatuses in FIG. 5, a sign "A" is added to each of units in the simulation apparatus 10A, and a sign "B" is added to each of units in the simulation apparatus 10B.

The data communication control units 24 and 31 also control the communication between the simulation apparatuses. For example, the communication between the model arithmetic unit 21A in the simulation apparatus 10A and the interface circuit 30B in the simulation apparatus 10B is achieved by the data communication control units 24A and 31B. Similarly, the communication between the model arithmetic unit 21B in the simulation apparatus 10B and the interface circuit 30A in the simulation apparatus 10A is achieved by the data communication control units 24B and 31A.

Although FIG. 5 illustrates the construction in which interface management units are provided in the arithmetic process units 20 and the interface circuits 30, a single interface management unit may be commonly provided in one set of the arithmetic process unit 20 and the interface circuit 30.

The data communication control unit 24 and the model arithmetic unit 21 may be composed of separate arithmetic devices. For example, the model arithmetic unit 21 may be composed of a CPU, and the data communication control unit 24 may be composed of a hardware circuit. Further, the model arithmetic unit 21 and the data communication control unit 24 may be configured such that the arithmetic operations of the model arithmetic unit 21 and the data communication control unit 24 are performed by a dual-core CPU (i.e., the arithmetic operations of the model arithmetic unit 21 and the data communication control unit 24 are performed by separate cores).

Figure 6:
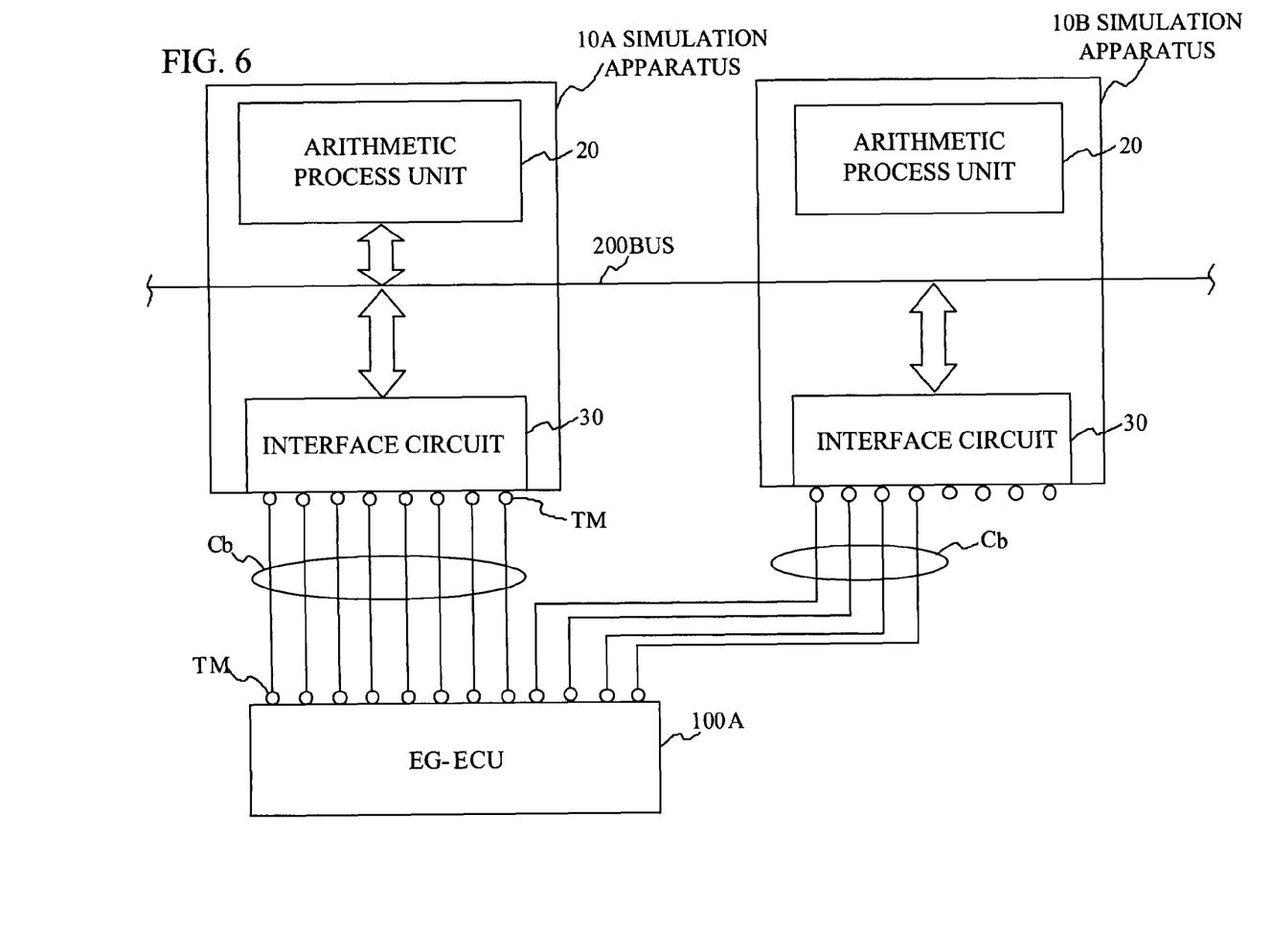
FIG. 6 is a block diagram showing another construction of the simulation apparatus.

Also, as shown in FIG. 6, one simulation apparatus (e.g. the simulation apparatus 10B shown in FIG. 6) is used only for the input and output signals from/to an ECU, and may not perform a model arithmetic operation. In addition, one simulation apparatus may be configured so as not to provide a model arithmetic unit performing the model arithmetic operation (e.g. the simulation apparatus 10B shown in FIG. 6 may be configured so as not to provide the arithmetic process unit 20).

Figure 7:
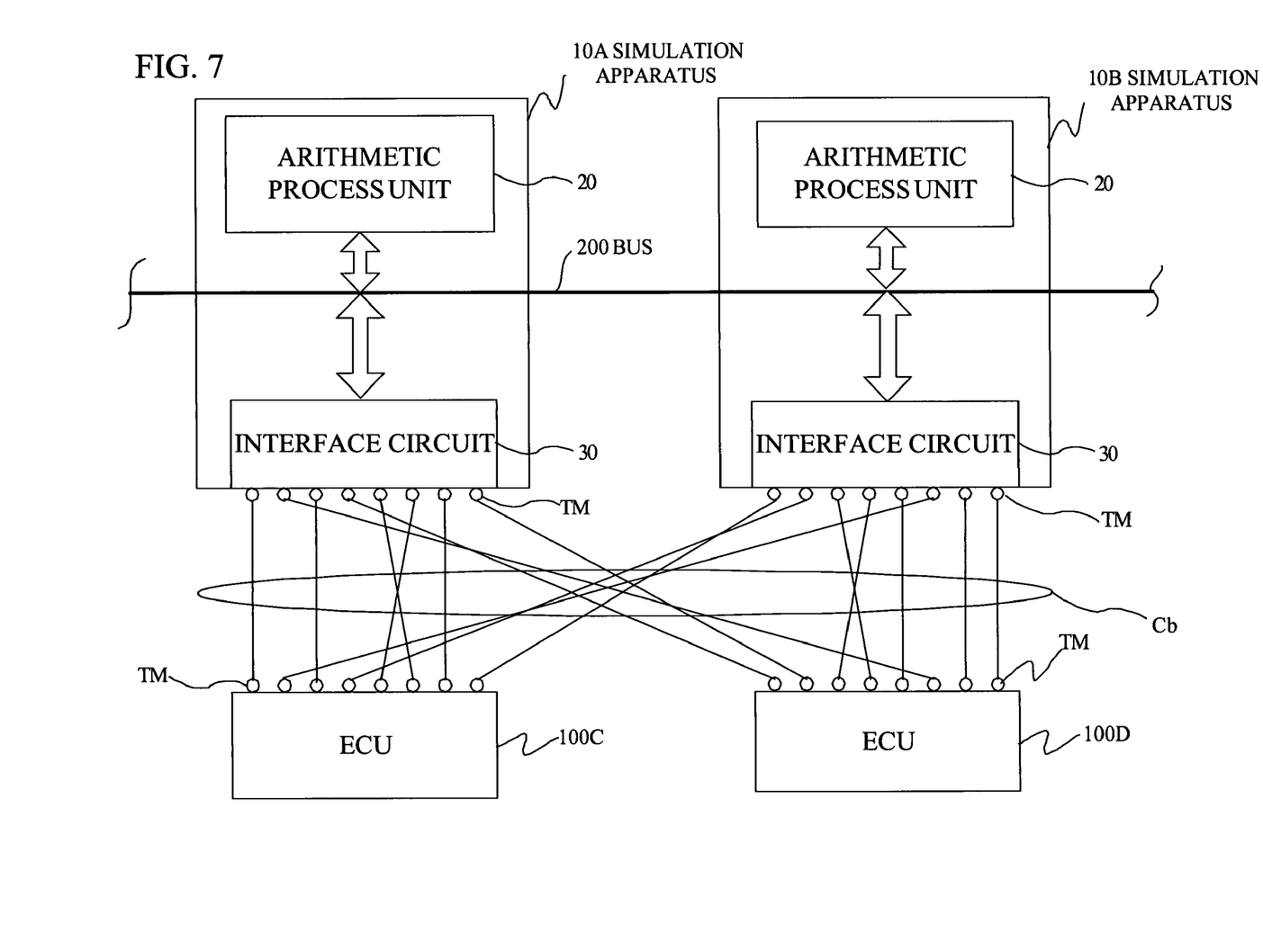
FIG. 7 is a block diagram showing the construction of the simulation system according to another embodiment of the present invention.

FIG. 7 is a block diagram showing the construction of the simulation system according to another embodiment of the present invention.

Although in the above described embodiment, a part of the engine ECU 100A inputs and outputs the signals by using the unused areas of the interface circuit 30 in the simulation apparatus 10B, two ECUs 100C and 100D can use the mutual unused areas of the interface circuits 30 as shown in FIG. 7 when the two ECUs 100C and 100D transfer and receive the signals to/from the arithmetic process units 20 in the simulation apparatuses 10A and 10B. In this case, the interface management units 23 are also provided in the respective arithmetic process units 20, and retain the common management information.

Although in the above described embodiment, the plurality of simulation apparatuses 100A and 100B are connected in a common bus form by the bus 200 from a viewpoint of the speed-up of the signal process, this is not limitative, but the present invention can be applied to the case where the simulation apparatuses 100A and 100B are connected by a network on behalf of the bus 200, the case where data (signals) is transferred and received between the simulation apparatuses 100A and 100B by using a shared memory, and so on.

Although in the above described embodiment, the two simulation apparatuses are connected in the common bus form, this is not limitative, but the simulation system may be configured such that still more simulation apparatuses are connected in the common bus form, and the interface management units 23 in the respective arithmetic process units 20 retain the common management information.

Although in the above described embodiment, the assignment of the input and output signals is automatically restored when the failure of the interface circuit 30 occurs, it is also possible to adopt a process informs a user of the unused channel for restoration, for example.

The present invention is achieved by an embodiment in which the ECU is achieved with a simulator (e.g. a simulator which is able to provide a control if there is only control software that simulates a microcomputer peripheral circuit and is embedded into a microcomputer) and a real machine (e.g. a vehicle) is used as a controlled object, or an embodiment in which both of the ECU and the controlled object are composed of the simulation apparatus, or the like.

Although in the above described embodiment, the input and output terminals TMs are composed of input terminals and output terminals, the present invention may be applied only to the input terminals or the output terminals.

The invention claimed is:

1. A simulation apparatus that simulates a controlled object which a controller controls, comprising:
    an arithmetic process portion that executes an arithmetic operation to simulate the controlled object; and
    a signal terminal that executes at least one of inputting and outputting a signal between the arithmetic process portion and the controller;
    wherein the arithmetic process portion executes at least one of inputting and outputting the signal from/to the controller by using another signal terminal provided on another simulation apparatus, the arithmetic process portion being connected to the another simulation apparatus by communication.

2. The simulation apparatus as claimed in claim 1, wherein the arithmetic process portion includes a model arithmetic portion that executes a model arithmetic operation to simulate the controlled object, and the simulation apparatus comprises a data communication process portion that executes data communication between the model arithmetic portion and the signal terminal.

3. The simulation apparatus as claimed in claim 2, wherein the data communication process portion is composed of an arithmetic device which is different from the model arithmetic portion, and executes a process.

4. The simulation apparatus as claimed in claim 1, wherein the arithmetic process portion executes at least one of inputting and outputting the signal from/to the controller by using a signal terminal provided on another simulation apparatus, without using another arithmetic process portion provided on another simulation apparatus, the arithmetic process portion being connected to the another simulation apparatus by communication.

5. The simulation apparatus as claimed in claim 1, wherein the arithmetic process portion is connected to the signal terminal by a bus, and the bus is connected to another arithmetic process portion and another signal terminal in the another simulation apparatus.

6. The simulation apparatus as claimed in claim 1, wherein the arithmetic process portion retains management information on the another signal terminal provided on the another simulation apparatus, and assigns the signal to the another signal terminal based on the management information.

7. A simulation apparatus that simulates a controller controlling a controlled object, comprising:
    an arithmetic process portion that executes an arithmetic operation to simulate the controller; and a signal terminal that executes at least one of inputting and outputting a signal between the arithmetic process portion and the controlled object;

wherein the arithmetic process portion executes at least one of inputting and outputting the signal from/to the controlled object by using another signal terminal provided on another simulation apparatus, the arithmetic process portion being connected to the another simulation apparatus by communication.

8. The simulation apparatus as claimed in claim 7, wherein the arithmetic process portion executes at least one of inputting and outputting the signal from/to the controlled object by using a signal terminal provided on another simulation apparatus, without using another arithmetic process portion provided on another simulation apparatus, the arithmetic process portion being connected to the another simulation apparatus by communication.

9. A simulation system that connects a first simulation apparatus simulating a first controlled object which a first controller controls, and a second simulation apparatus simulating a second controlled object which a second controller controls, to each other, and executes simulation, comprising:

the first simulation apparatus including:
a first arithmetic process portion that executes an arithmetic operation to simulate the first controlled object; and
a first signal terminal that executes at least one of inputting and outputting a signal between the first arithmetic process portion and the first controller; and the second simulation apparatus including:
a second arithmetic process portion that executes an arithmetic operation to simulate the second controlled object; and
a second signal terminal that executes at least one of inputting and outputting a signal between the second arithmetic process portion and the second controller;

wherein the first arithmetic process portion executes at least one of inputting and outputting the signal from/to the first controller by using the second signal terminal.

10. A simulation system that connects a first simulation apparatus simulating a first controller controlling a first controlled object, and a second simulation apparatus simulating a second controller controlling a second controlled object, to each other, and executes simulation, comprising:

the first simulation apparatus including:
a first arithmetic process portion that executes an arithmetic operation to simulate the first controller; and
a first signal terminal that executes at least one of inputting and outputting a signal between the first arithmetic process portion and the first controlled object; and the second simulation apparatus including:
a second arithmetic process portion that executes an arithmetic operation to simulate the second controller; and
a second signal terminal that executes at least one of inputting and outputting a signal between the second arithmetic process portion and the second controlled object;

wherein the first arithmetic process portion executes at least one of inputting and outputting the signal from/to the first controlled object by using the second signal terminal.

11. A simulation method simulating a controlled object which a controller controls, comprising:
executing at least one of inputting and outputting a signal from/to the controller by using a signal terminal provided on another simulation apparatus; and executing an arithmetic operation to simulate the controlled object.

12. A simulation method simulating a controller controlling a controlled object, comprising:
executing at least one of inputting and outputting a signal from/to the controlled object by using a signal terminal provided on another simulation apparatus; and
executing an arithmetic operation to simulate the controller.

* * * * *